US009146665B2

(12) United States Patent
Gandhi

(10) Patent No.: US 9,146,665 B2
(45) Date of Patent: Sep. 29, 2015

(54) SYSTEMS AND METHODS FOR ENHANCING USER INTERACTION WITH DISPLAYED INFORMATION

(75) Inventor: Saumil Ashvin Gandhi, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 251 days.

(21) Appl. No.: 13/249,949

(22) Filed: Sep. 30, 2011

(65) Prior Publication Data

US 2013/0086530 A1 Apr. 4, 2013

(51) Int. Cl.
*G06F 3/048* (2013.01)
*G06F 3/0488* (2013.01)
*G06F 3/0484* (2013.01)
*G06F 3/0481* (2013.01)
*G06F 17/21* (2006.01)

(52) U.S. Cl.
CPC ............ *G06F 3/0488* (2013.01); *G06F 3/0484* (2013.01); *G06F 3/04812* (2013.01)

(58) Field of Classification Search
CPC ... G06F 3/0481; G06F 3/04812; G06F 3/048; G06F 3/0482; G06F 3/04855; G06F 3/04842; G06F 3/0486; G06F 3/0488; G06F 3/0484
USPC ......... 715/705, 708, 711, 809, 817, 856, 861, 715/862
See application file for complete search history.

(56) References Cited

U.S. PATENT DOCUMENTS

| | | | | |
|---|---|---|---|---|
| 5,995,101 | A * | 11/1999 | Clark et al. | 715/711 |
| 5,995,102 | A * | 11/1999 | Rosen et al. | 715/856 |
| 6,529,217 | B1 * | 3/2003 | Maguire et al. | 715/769 |
| 7,076,743 | B2 | 7/2006 | Ingram et al. | |
| 7,100,123 | B1 * | 8/2006 | Todd et al. | 715/862 |
| 7,159,188 | B2 * | 1/2007 | Stabb et al. | 715/787 |
| 7,669,123 | B2 * | 2/2010 | Zuckerberg et al. | 715/273 |
| 7,975,019 | B1 * | 7/2011 | Green et al. | 709/217 |
| 7,986,309 | B2 * | 7/2011 | Kim | 345/173 |
| 8,122,014 | B2 * | 2/2012 | Brindley et al. | 707/722 |
| 8,352,884 | B2 * | 1/2013 | Zalewski et al. | 715/864 |
| 2004/0021647 | A1 | 2/2004 | Iwema et al. | |
| 2005/0024239 | A1 | 2/2005 | Kupka | |
| 2006/0020904 | A1 * | 1/2006 | Aaltonen et al. | 715/850 |

(Continued)

OTHER PUBLICATIONS

PCT International Search Report and the Written Opinion mailed Jun. 19, 2012, in related International Application No. PCT/US2012/030934.

(Continued)

*Primary Examiner* — Wilson Tsui
(74) *Attorney, Agent, or Firm* — Haynes and Boone, LLP

(57) ABSTRACT

A method of enhancing user interaction with content displayed on a display of a touch screen device is provided. The method includes displaying at least one enhanced cursor within a viewable area of the display, the at least one enhanced cursor having a predefined action associated therewith, and receiving a selection of the at least one enhanced cursor. The method also includes detecting movement of the selected at least one enhance cursor onto displayed content, and executing the predefined action on the content. The method may further include detecting a subject matter of content being displayed on a display of a device coupled to the processor. Furthermore, a non-transitory computer-readable medium storing instructions for execution by a processor that cause the processor to perform the provided method may also be provided.

18 Claims, 6 Drawing Sheets

(56) References Cited

U.S. PATENT DOCUMENTS

| | | | |
|---|---|---|---|
| 2006/0184902 A1 | 8/2006 | Hayes, Jr. et al. | |
| 2007/0136690 A1* | 6/2007 | MacLaurin et al. | 715/822 |
| 2008/0012832 A1 | 1/2008 | GuangHai | |
| 2008/0244460 A1* | 10/2008 | Louch | 715/856 |
| 2010/0192105 A1* | 7/2010 | Kim et al. | 715/834 |
| 2010/0269039 A1* | 10/2010 | Pahlavan et al. | 715/702 |
| 2011/0102320 A1 | 5/2011 | Hauke et al. | |
| 2012/0136756 A1* | 5/2012 | Jitkoff et al. | 705/27.1 |

OTHER PUBLICATIONS

PCT International Preliminary Report on Patentability and the Written Opinion mailed Apr. 10, 2014, in related International Application No. PCT/US2012/030934.

* cited by examiner

SYSTEMS AND METHODS FOR ENHANCING USER INTERACTION WITH DISPLAYED INFORMATION

BACKGROUND

1. Technical Field

Embodiments disclosed herein are related to systems and methods for enhancing user interaction with online content. In particular, embodiments disclosed herein are related to displaying an enhanced cursor-like content selection area, or "Smart Spot", that allows users to automatically execute predefined actions on the selected content.

2. Related Art

Electronic devices, particularly computers, have become part of the daily lives of many people such that interfacing with content on a computer has become as familiar to people as turning the pages of a book. People understand the basic mechanics of selecting items displayed on a screen by moving a cursor to an item to be selected. People also understand that there are certain predefined actions can occur by pressing certain buttons or keys on the selected item. For example, a single mouse click, such as a left button click, will often select the item on which the cursor is positioned. A double left click may execute a program associated with the item on which the cursor is positioned. A right mouse button click (or command + click for Macintosh™ users) will open a menu of possible actions to perform on the item on which the cursor is positioned. These actions have become very familiar to users when interacting with desktop and laptop computers, and other devices that use human interface devices (HID) such as mice and trackballs.

As electronic devices become smaller and mobile, one of the difficulties has been trying to replicate the interaction users have become used to on desktop and laptop computers with HIDs such as mice and trackballs. Mobile devices that use a touch screen interface have been able to mimic the familiar point and click interface from desktop and laptop computers with a stylus or user finger acting as the "point" and the tapping of the screen at a certain location acting as the "click". However, this method of interfacing with content displayed on a screen of a mobile device is limited in the actions that can be performed by the act of tapping on the screen. The act of tapping the screen typically selects the tapped object, which may then follow a hyperlink or execute an application represented by the object. Certain mobile devices include framework which may bring up a menu of options when the tap is held on the screen for a predetermined amount of time. However, this is often unintuitive to a user and may result in the selection or execution of the object being tapped because the user did not hold the tap for the predetermined amount of time. In addition, navigating the displayed menus for the desired action takes additional actions and time which can be burdensome to the user.

Moreover, when viewing content, such as web pages and other content displaying text to the user on a mobile device, it can be difficult to select or highlight portions of the web page or text. For example, users are accustomed to be able to easily select portions of text displayed by a desktop or laptop computer by highlighting the text using the HID. Users are used to being able to perform actions on the selected text, such as cut and paste. On a mobile device having a touch screen, the functionality for selecting text or other portions of the displayed web page are not intuitive and can be difficult, particularly on mobile devices having a very small display area, such as a mobile phone. Moreover, once the text or other portions of the displayed web page are selected, the actions that can be performed on the selection are limited to copy and paste functionality.

Similarly, when browsing the internet using a mobile device, users may have difficulty in selecting a hyperlink or anchor on a displayed web page. This is particularly true if the mobile device has a small display area, such as on a mobile phone. When numerous anchors or hyperlinks are displayed by the mobile device, a user often accidentally selects the unintended anchor or hyperlink, which causes the user to have to go back to the previous page and try to select the correct anchor or hyperlink again. Or, the user will have to zoom into the displayed webpage to select the correct anchor or hyperlink and then zoom back out again once the desired content is displayed. Despite the many capabilities that many modern mobile devices have, users are unable or reluctant to take full advantage of these capabilities due to issues interacting with the displayed information, such as have been described here.

Accordingly, there is a need for a system and method that provides an enhanced user interaction with displayed content, particularly content displayed on mobile devices and touch-screen devices.

SUMMARY

Consistent with some embodiments, there is provided a computer-readable medium having instructions for execution by a processor that, when executed, cause the processor to perform a method for enhancing user interaction with displayed content, the method including detecting a subject matter of content being displayed on a display of a device coupled to the processor. The method also includes displaying at least one enhanced cursor within a viewable area of a display, assigning predefined actions to the at least one enhanced cursor based on the detected subject matter, and executing the predefined actions when the enhanced cursor is moved onto the content.

Consistent with some embodiments, there is also provided a method of enhancing user interaction with content displayed on a display of a touch screen device. The method includes displaying, on the display of the touch screen device, at least one enhanced cursor within a viewable area of the display, the at least one enhanced cursor having a predefined action associated therewith, receiving, at a touch screen of the touch screen device, a selection of the at least one enhanced cursor. The method also includes detecting, by the touch screen, movement of the selected at least one enhanced cursor onto displayed content, and executing, using a processor of the touch screen device, the predefined action on the content.

These and other embodiments will be described in further detail below with respect to the following figures.

Figure 1:
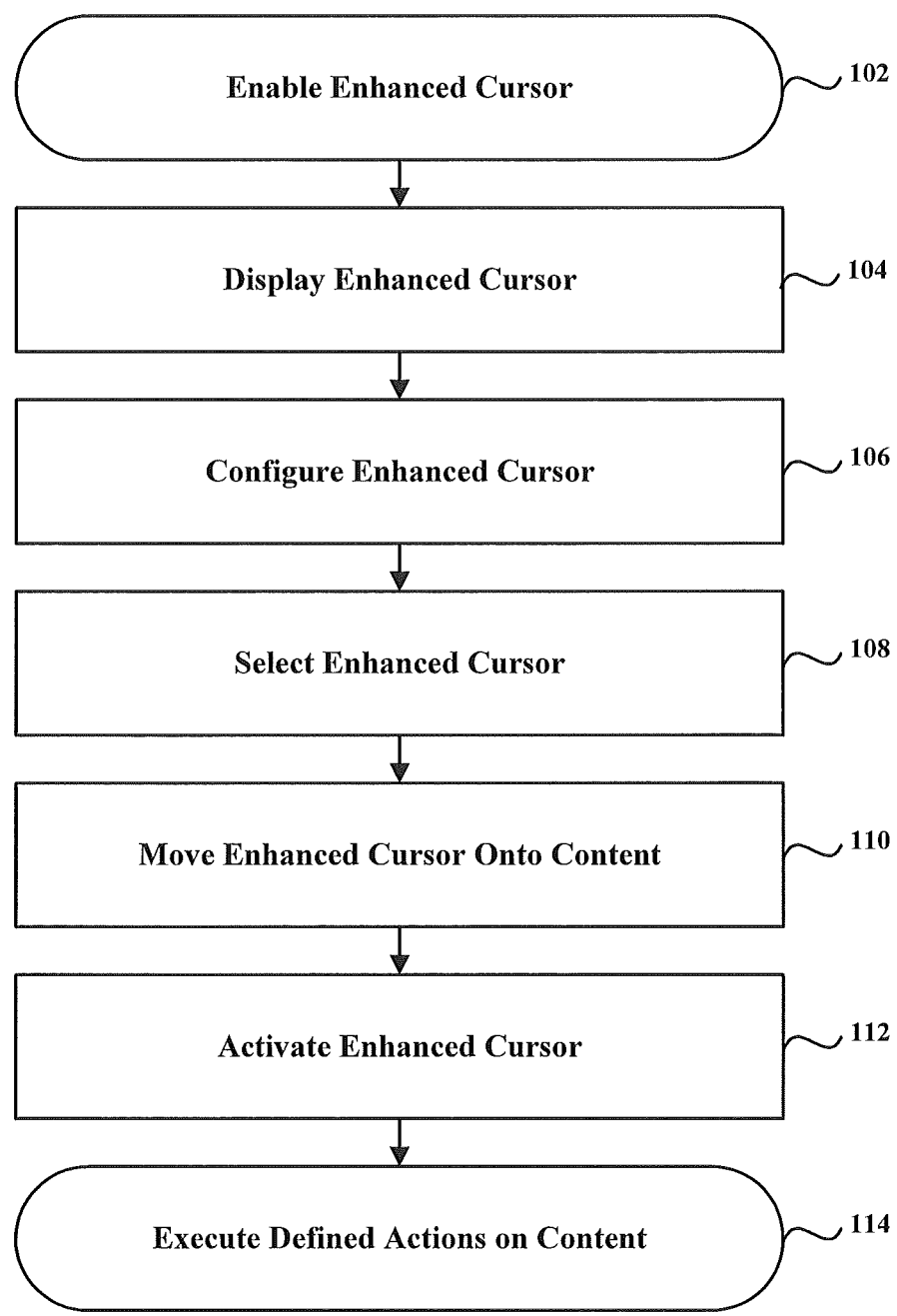
FIG. 1 is a flowchart illustrating a method for enhancing user interaction with displayed content, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Embodiments as described herein are related to using a "Smart Spot" or enhanced cursor-like selection area (referred to herein as an enhanced cursor) that allows for one or more predefined actions or a series of predefined actions to be executed or performed on displayed content to enhance user interaction. The enhanced cursor may be displayed on a display screen also having content displayed thereon. A user can select the enhanced cursor, drag the cursor onto content or drag content onto the cursor, and then the predefined actions associated with the enhanced cursor will be executed on the content. The predefined actions may include an internet search, a text search, copy/paste functionality, buying or bidding on purchasable items, or paying for purchased items. The predefined actions may be facilitated by third-party application program interfaces (APIs) that perform actions defined by the third party and, in some cases, relate to the third party's business. The content may be a displayed web page, a text document, or a picture. The predefined actions may further override any previously defined actions on the content that instituted by the operating system or application displaying the content. The enhanced cursor may be fully configurable and customizable by a user to perform a specific action or multiple actions or to have a specific user-selected design and appearance. The enhanced cursor may be used on touch screen devices, such as smart phones and tablet computers such that a user can select the enhanced cursor with their finger, and slide the enhanced cursor onto displayed content to perform the defined actions on the displayed content. Alternatively, the enhanced cursor may be used with desktop and laptop computers, where a user can select the enhanced cursor with a mouse, trackball, or other human interface device (HID) and move the enhanced cursor onto content to perform the defined actions on the content. The enhanced cursor may be implemented as instructions stored on a computer-readable medium that may be executed by a processor, and may be implemented as an add-on to existing web browser, document editor, or other application functionality, or as a widget running within the operating system framework. Consistent with the disclosed embodiments, the enhanced cursor enhances user interaction with displayed content by allowing the user to execute or perform predefined actions on content quickly and easily.

FIG. 1 is a flowchart illustrating a method for enhancing user interaction with displayed content, consistent with some embodiments. As shown in FIG. 1, the method begins by enabling the enhanced cursor (102). The enhanced cursor may be a separate program, application or "app", or a widget, each of which may correspond to instructions stored in a non-transient, tangible memory for execution by a processor. Further the enhanced cursor may be an add-on to the existing functionality of a running program, such as a word processor, text editor, or web browser, such that the enhanced cursor may be selectively enabled or disabled by a user. Further, the enhanced cursor may be enabled using JavaScript. After the enhanced cursor has been enabled, the enhanced cursor will be displayed (104). Consistent with some embodiments, the enhanced cursor will be displayed within a viewable area of the display. Further consistent with some embodiments, the enhanced cursor may be displayed within an area of the display so as not to obscure the displayed content. Alternatively, the enhanced cursor may be displayed on a "dock" or "toolbar" of the running application or the operating system to facilitate easy selection by the user without obscuring the displayed content.

A user may have the ability to configure the enhanced cursor (106). A more in-depth configuration of the enhanced cursor will be described with respect to FIG. 4, below. Returning to FIG. 1, the user may configure certain properties of the enhanced cursor, such as the appearance, location, and predefined actions of the cursor. The predefined actions may include the actions performed by the cursor on selected content and/or actions that an inactive enhanced cursor may perform. For example, an inactive enhanced cursor may be a clock displaying the current time, a thermometer displaying the current local temperature (or the temperature of a user-selected area), or a trash or recycling bin such that a user could drag content into the inactive enhanced cursor to delete selected content. The enhanced cursor may also include historic information regarding usage of the enhanced cursor, such that a user can view previous actions executed by the enhanced cursor. An inactive enhanced cursor may also be used to provide enhanced navigation of content. For example, the inactive enhanced cursor may be configured to always be displayed in an inactive part of the displayed content, providing a visual clue for the user where they can touch in the displayed content without activating any actions. This can be useful when navigating on a device with a small screen and many internet hyperlinks. The enhanced cursor could be configured to be displayed in a portion of the small screen where there are no displayed hyperlinks, such that the user knows that it is a "safe" spot to touch the screen and navigate the page without activating a hyperlink to a different page.

The user may next select the enhanced cursor (108). The enhanced cursor may be selected using a finger or stylus if the display is a touch screen display, such as found on a smart phone or tablet computer, whereas if the display is coupled to or part of a desktop or laptop computer, the user may use a human interface device such as a mouse, trackball, or keyboard to select the enhanced cursor. The selected enhanced cursor may then be moved onto the displayed content of interest (110). Consistent with some embodiments, the enhanced cursor may require activation before being permitted to move. In such embodiments, a user may first press and hold the enhanced cursor to activate movement of the enhanced cursor. Once the enhanced cursor has been moved onto the displayed content of interest, the user can activate the enhanced cursor to perform the associated predefined action or actions. Activating the enhanced cursor may comprise tapping or clicking on the enhanced cursor, or, in some embodiments, double-tapping or double-clicking the enhanced cursor. Once the enhanced cursor has been activated, the predefined or assigned actions associated with the enhanced cursor are executed on the content (114). Consistent with some embodiments, after the predefined or assigned actions have been executed or performed by the enhanced cursor, the enhanced cursor may then return to an inactive state and/or may return to its original location within the displayed content or on a dock or toolbar.

Moreover, after the predefined or assigned actions have been executed or performed by the enhanced cursor, the enhanced cursor can provide additional functionality such as communicating the executed actions to a social networking site such as Facebook™, Twitter™, or Google+™. Such social networking communications may be configured in step 106 and may be personalized such that the communications only occur when certain actions are performed, such as bidding on, or purchasing items online using the enhanced cursor.

Figure 2:
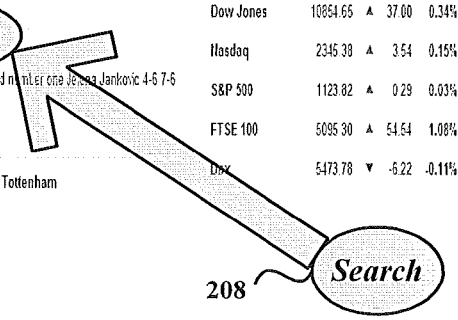
FIG. 2 is a diagram illustrating the use of an enhanced cursor on displayed content, consistent with some embodiments.

FIG. 2 is a diagram illustrating the use of an enhanced cursor on displayed content, consistent with some embodiments. To illustrate the method described in FIG. 1, certain steps of the method described in FIG. 1 will be discussed in conjunction with FIG. 2. As shown in FIG. 2, content 202 is displayed on a display 204 of a processing device 206. Consistent with some embodiments, processing device 206 may include any appropriate combination of hardware and/or software having a processor and capable of reading instructions stored on a non-transitory machine-readable medium for execution by the processor. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Further, processing device 206 may be configured for wired and/or wireless communication over a network. According to some embodiments, processing device 206 may be a mobile device, such as a mobile phone, a smart phone, or a tablet computer such as the Apple™ iPad™. According to other embodiments, processing device 206 may be a processing device such as a personal computer, a personal digital assistant (PDA), or a notebook computer.

Consistent with some embodiments processing device 206 includes a machine-readable medium, such as a memory (not shown) that includes instructions for execution by a processor (not shown) for causing processing device 206 to perform specific tasks. For example, such instructions may include a displaying content 202, such as the shown web page, or other applications that display content 202 corresponding to a text document, a Microsoft® Word® document, or an Adobe® PDF® document. Further, content 202 may be content displayed by a particular application or "app" stored in a memory of processing device 206 and executed by a processor of processing device 206. For example, content 202 may be a news web page, such as shown in FIG. 2, or content 202 may be an online auction or transaction web page displayed by a web page or application.

Content 202 may also be a live or saved image captured by a camera coupled to processing device 206 or stored in memory of processing device 206 that has been processed using optical character recognition (OCR). Consequently, a user may view an image and perform actions on portions of the image that can be recognized using OCR. For example, processing device may be a smart phone or tablet computer having an integrated camera such that a user can use the camera to provide an augmented reality and view the surrounding area and perform actions on, for example, the names of stores and restaurants that are displayed such that the user can search for additional information or reviews about these stores and restaurants. In addition, enhanced cursor 208 may further have a translate function such that if a user is in a foreign country with signs in languages that the user cannot read, the user can view the surrounding area using the camera of the processing device, and use enhanced cursor 208 on selected signs to translate the signs into a language that the user can read.

As shown in FIG. 2, once an enhanced cursor 208 is enabled (102), enhanced cursor 208 is displayed (104) in a portion of display 204 where no content is currently displayed so as not to obscure the displayed content. A user may then configure enhanced cursor 208 to assign actions or change the shape of enhanced cursor 208 (106). For example, enhanced cursor 208 has been assigned a "search" function, and been configured to have an elliptical shape. Consistent with some embodiments, the predefined actions of enhanced cursor 208 may be selectable using a drop-down menu or simple selection of actions appearing upon selection of enhanced cursor. Alternatively, the functionality and shape of enhanced cursor 208 may correspond to a "default" configuration of enhanced cursor 208. The user may then select enhanced cursor 208 (108) and move enhanced cursor 208 onto content of interest (110). As shown in FIG. 2, a user may want to search to find more about the displayed content of "Cincinnati title" and, thus, will move enhanced cursor 208 onto that displayed content. The user would then activate enhanced cursor 208 (112) such that the assigned action of a search would be performed on the displayed content within the enhanced cursor. Once the assigned action is performed, another window or screen, or tab for browsers and other content displaying programs that utilize tabbed browsing, would be displayed on display 204 showing the results of the assigned and executed action associated with enhanced cursor 208.

Figure 3:
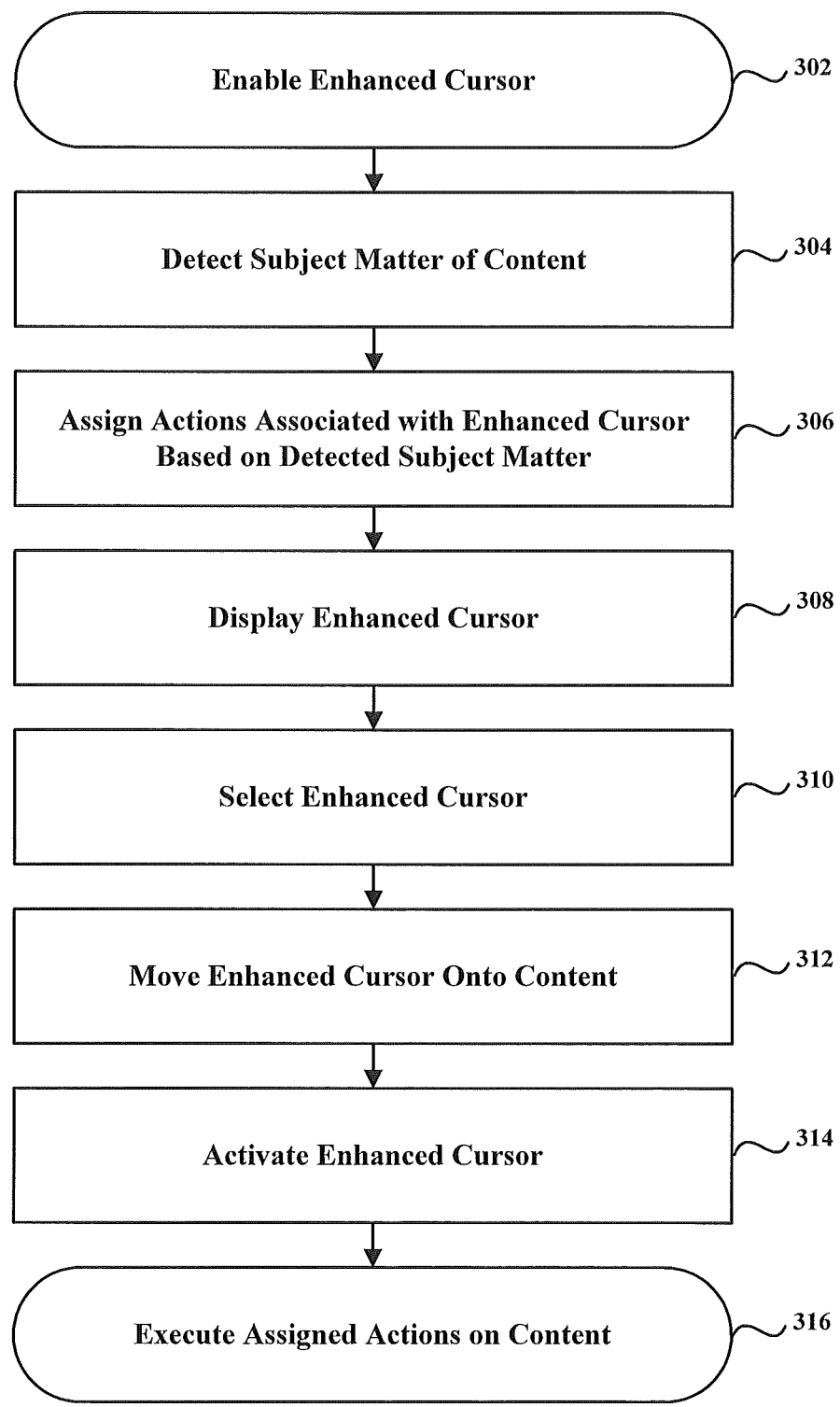
FIG. 3 is a flowchart illustrating a method of using an enhanced cursor on displayed content, consistent with some embodiments.

FIG. 3 is a flowchart illustrating a method of using an enhanced cursor on displayed content, consistent with some embodiments. FIG. 3 is similar to FIG. 1, but adds an additional step wherein the subject matter of the displayed content is automatically detected by the executing instructions, program, application, or widget responsible for the enhanced cursor, and automatically assigns actions to be associated with the enhanced cursor based on the detected subject matter. For illustration purposes, the method illustrated in FIG. 3 will be discussed in conjunction with the diagram shown in FIG. 2. As shown in FIG. 3, the method begins by enabling enhanced cursor 208 (302). Enhanced cursor 208 may be a separate program, application or "app", or a widget, each of which may correspond to instructions stored in a non-transient, tangible memory for execution by a processor. Further enhanced cursor 208 may be an add-on to the existing functionality of a running program, such as a word processor, text editor, or web browser, such that enhanced cursor 208 may be selectively enabled or disabled by a user. After enhanced cursor 208 has been enabled, instructions associated with enhanced cursor 208 are executed to detect a subject matter of content 202 displayed on display 204 of processing device 206 (304). Consistent with some embodiments, the subject matter may be detected from the type of program or application currently executing on processing device 206. Alternatively, the subject matter may be detected by parsing the text of the displayed content 202 or by parsing the content 202 itself. Based on the detected subject matter, actions will be automatically assigned to enhanced cursor 208 (306). For example, if it is determined that the type of program or application currently executing is a web browser, enhanced cursor 208 may be automatically assigned a search function. Alternatively, if it is determined that the type or program or application currently executing is a word processor or text editor, enhanced cursor 208 may be automatically assigned a copy/ paste function. Moreover, if content 202 is parsed to determine that an online auction site, such as provided by eBay, Inc. of San Jose, Calif., is currently being displayed, enhanced cursor 208 may be automatically assigned a bid functionality or an auction search functionality. Further, if content 202 is parsed to determine that a transaction is required concurrent with content 202, enhanced cursor may be automatically assigned a payment functionality such as may be provided by PayPal, Inc. of San Jose, Calif. As another example, content 202 is detected as being a news website and, thus, enhanced cursor 208 is assigned a search functionality. Consistent with other embodiments, enhanced cursor 208 may be assigned a particular color based on the detected subject matter of content 202.

Returning to FIG. 3, enhanced cursor 208 is then displayed (308). Consistent with some embodiments, enhanced cursor 208 will be displayed within a viewable area of display 204. Further consistent with some embodiments, enhanced cursor 208 may be displayed within an area of display 204 so as not to obscure displayed content 202. Alternatively, enhanced cursor 208 may be displayed on a "dock" or "toolbar" of the running application or the operating system to facilitate easy selection by the user without obscuring displayed content 202. The user may next select enhanced cursor 208 (310). Enhanced cursor 208 may be selected using a finger or stylus if the display is a touch screen display, such as found on a smart phone or tablet computer, whereas if the display is coupled to or part of a desktop or laptop computer, the user may use a human interface device such as a mouse, trackball, or keyboard to select the enhanced cursor. The selected enhanced cursor 208 may then be moved onto the displayed content of interest (312) where the user may then activate enhanced cursor 208 (314). Consistent with some embodiments, activating enhanced cursor 208 may comprise tapping or clicking on enhanced cursor 208, or, in some embodiments, double-tapping or double-clicking enhanced cursor 208. Once enhanced cursor 208 has been activated, the predefined or assigned actions associated with enhanced cursor 208 are executed on content 202 (316). Consistent with some embodiments, after the predefined or assigned actions have been executed or performed by enhanced cursor 208, enhanced cursor 208 may then return to an inactive state and/or may return to its original location within displayed content 202 or on a dock or toolbar.

Figure 4:
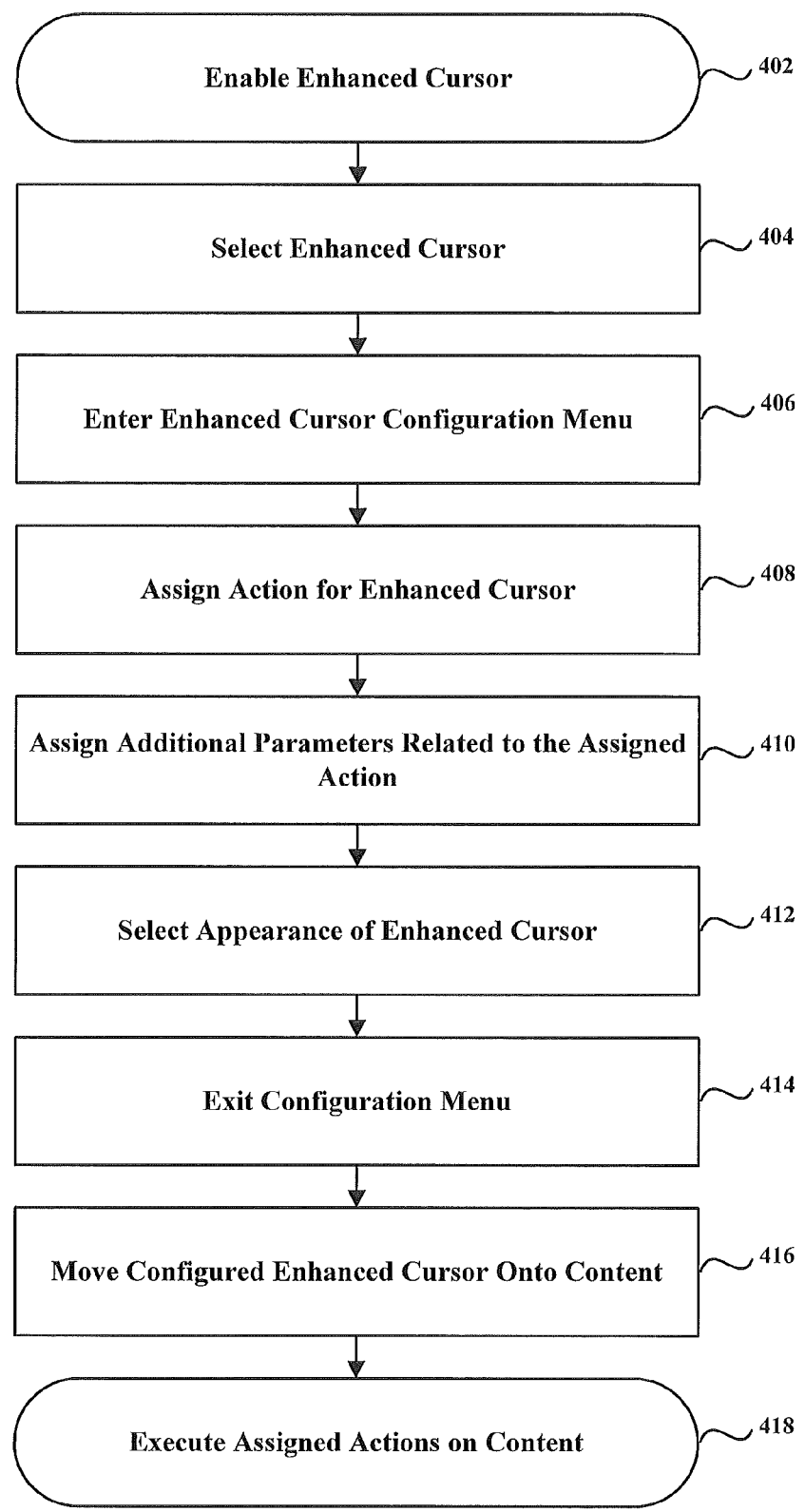
FIG. 4 is a flowchart illustrating a method of using of an enhanced cursor on displayed content, consistent with some embodiments.

FIG. 4 is a flowchart illustrating a method of using of an enhanced cursor on displayed content, consistent with some embodiments. FIG. 4 is similar to FIGS. 1 and 3, but adds additional steps for configuring enhanced cursor 208. Consistent with some embodiments, the method illustrated in FIG. 4 may correspond to the configuration step 106 shown in FIG. 1. Alternatively, the method shown in FIG. 4 may be integrated with the method shown in FIG. 3 such that enhanced cursor 208 that is automatically assigned actions based on the detected subject matter of the content can also be configured. For illustration purposes, the method illustrated in FIG. 4 will be discussed in conjunction with the diagram shown in FIG. 2. As shown in FIG. 4, the method begins by enabling enhanced cursor 208 (402). Enhanced cursor 208 may be a separate program, application or "app", or a widget, each of which may correspond to instructions stored in a non-transient, tangible memory for execution by a processor. Further enhanced cursor 208 may be an add-on to the existing functionality of a running program, such as a word processor, text editor, or web browser, such that the enhanced cursor may be selectively enabled or disabled by a user. The user may next select enhanced cursor 208 (404). Enhanced cursor 208 may be selected using a finger or stylus if the display is a touch screen display, such as found on a smart phone or tablet computer, whereas if the display is coupled to or part of a desktop or laptop computer, the user may use a human interface device such as a mouse, trackball, or keyboard to select the enhanced cursor.

A user may then enter a configuration menu for configuring enhanced cursor 208 (406). Within configuration menu, a user may assign an action for enhanced cursor 208 (408). The assigned actions may include an internet search, a text search, copy/paste functionality, searching for, buying, or bidding on purchasable items, or paying for purchased items. The user may then assign additional parameters related to the assigned action (410). Such additional parameters may include a specific search engine, parameters related to displaying the results of the executed action (i.e., such as display in a separate tab, window, pop-up window, etc.). The additional parameters may also include a secondary action, or even a series of actions assigned to enhanced cursor 208. Assigning a secondary action or a series of actions to enhanced cursor allows a user to chain actions together to be performed together. For example, a user may configure enhanced cursor 208 to have a copy action and then assign a secondary paste action. Once the user activates enhanced cursor 208 to execute the copy action, enhanced cursor now switches to the secondary action so that the user can activate enhanced cursor 208 to execute a paste action. Another example would be an enhanced cursor having an eBay search function and a secondary action of a PayPal function. Once the user has executed the eBay search function using enhanced cursor 208, the user can then execute the PayPal action using enhanced cursor 208 to pay for and purchase goods returned by the executed eBay search function.

A user may then select the appearance of enhanced cursor 208 (412), allowing the user to personalize and further enhance their interaction with content 202. For example, a user may choose enhanced cursor 208 to be ball-shaped based on their favorite sport, and may further configure enhanced cursor 208 to display a user-defined news or scores from a Really Simple Syndication (RSS) feed associated with their favorite sport or favorite team. Moreover, enhanced cursor 208 may be further configured to perform actions on the screen when not in use. One example would be a ball-shaped enhanced cursor bouncing or rolling around on the screen. A user may also choose enhanced cursor 208 to appear as a clock that displays the current time. Further, a user may choose enhanced cursor 208 to take the appearance of the user's online avatar or any other image or picture of the user's choosing. The user may further customize enhanced cursor 208 to automatically communicate information related to the executed actions to social networking sites of the user's choosing, with language chosen by the user.

Once the appearance of enhanced cursor 208 has been selected, the user may exit the enhanced cursor configuration menu (414). Enhanced cursor 208 may then be moved onto the displayed content of interest (416) and the predefined or assigned actions associated with enhanced cursor 208 are executed on content 202 (418). Consistent with some embodiments, after the predefined or assigned actions have been executed or performed by enhanced cursor 208, enhanced cursor 208 may then return to an inactive state and/or may return to its original location within displayed content 202 or on a dock or toolbar.

Figure 5:
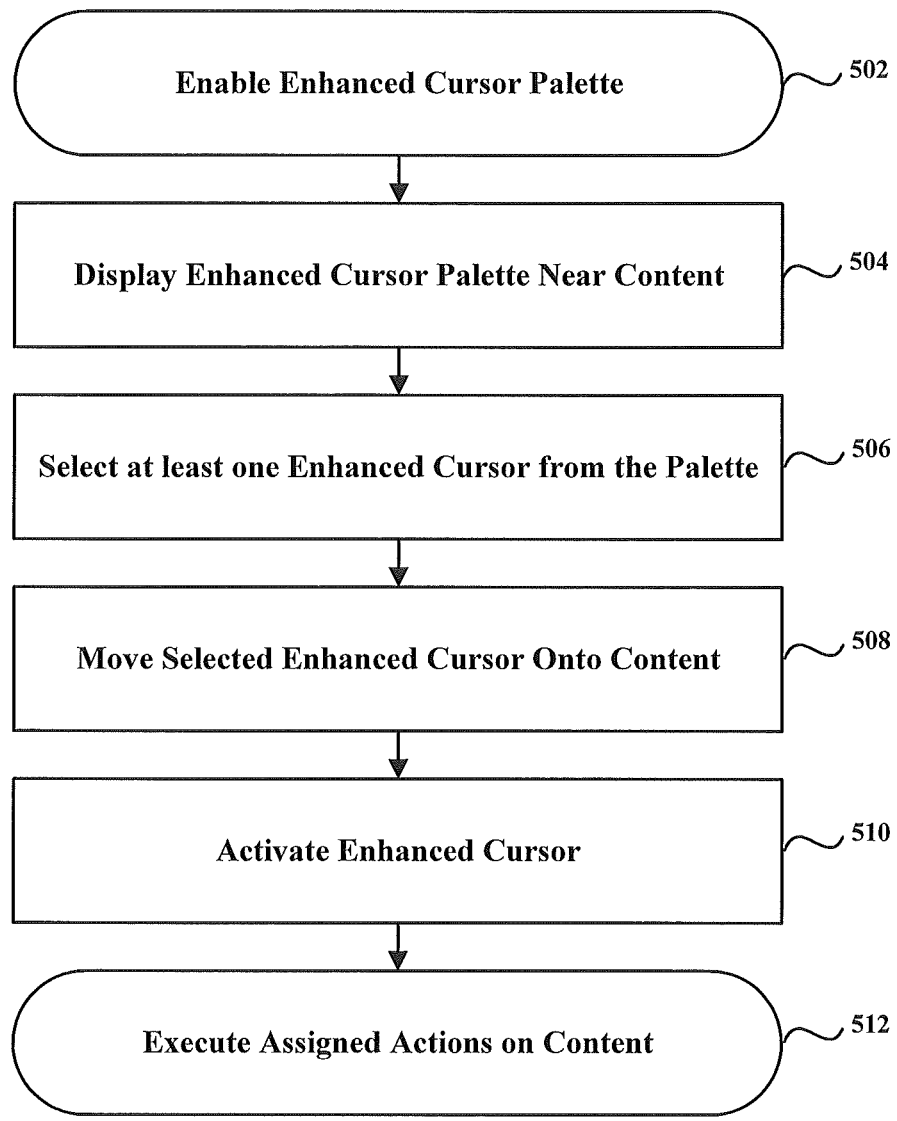
FIG. 5 is a flowchart illustrating a method for enhancing user interaction with displayed content using an enhanced cursor palette, consistent with some embodiments.

FIG. 5 is a flowchart illustrating a method for enhancing user interaction with displayed content using an enhanced cursor palette, consistent with some embodiments. The method illustrated in FIG. 5 is similar to methods illustrated in FIGS. 1, 3, and 4, but instead of a single enhanced cursor, allows a user to choose one or more enhanced cursors from a palette of enhanced cursors. As shown in FIG. 5, the method begins by enabling the enhanced cursor palette (502). The enhanced cursor palette may be a separate program, application or "app", or a widget, each of which may correspond to instructions stored in a non-transient, tangible memory for execution by a processor. Further the enhanced cursor palette may be an add-on to the existing functionality of a running program, such as a word processor, text editor, or web browser, such that the enhanced cursor palette may be selectively enabled or disabled by a user. After the enhanced cursor palette has been enabled, the enhanced cursor palette will be displayed (504). Consistent with some embodiments, the enhanced cursor palette will be displayed within a viewable area of the display. Further consistent with some embodiments, the enhanced cursor palette may be displayed within an area of the display so as not to obscure the displayed content. The enhanced cursor palette may also be translucent to further prevent obscuring the displayed content. Alternatively, the enhanced cursor palette may be displayed on a "dock" or "toolbar" of the running application or the operating system to facilitate easy selection by the user without obscuring the displayed content.

A user may have the ability to configure the enhanced cursors displayed in the enhanced cursor palette consistent with the method described in FIG. 4. Alternatively, the enhanced cursors in the enhanced cursor palette may be automatically configured consistent with the method illustrated in FIG. 3. Returning to FIG. 5, the user may next select at least one enhanced cursor from the enhanced cursor palette (506). The enhanced cursor may be selected from the enhanced cursor palette using a finger or stylus if the display is a touch screen display, such as found on a smart phone or tablet computer, whereas if the display is coupled to or part of a desktop or laptop computer, the user may use a human interface device such as a mouse, trackball, or keyboard to select the enhanced cursor from the enhanced cursor palette. The selected enhanced cursor may then be moved onto the displayed content of interest (508) where the user may then activate the enhanced cursor (510). Consistent with some embodiments, activating the enhanced cursor may comprise tapping or clicking on the enhanced cursor, or, in some embodiments, double-tapping or double-clicking the enhanced cursor. Once the enhanced cursor has been activated, the predefined or assigned actions associated with the enhanced cursor are executed on the content (512). Consistent with some embodiments, after the predefined or assigned actions have been executed or performed by the enhanced cursor, the enhanced cursor may then return to an inactive state and/or may return to its original location within palette.

Figure 6:
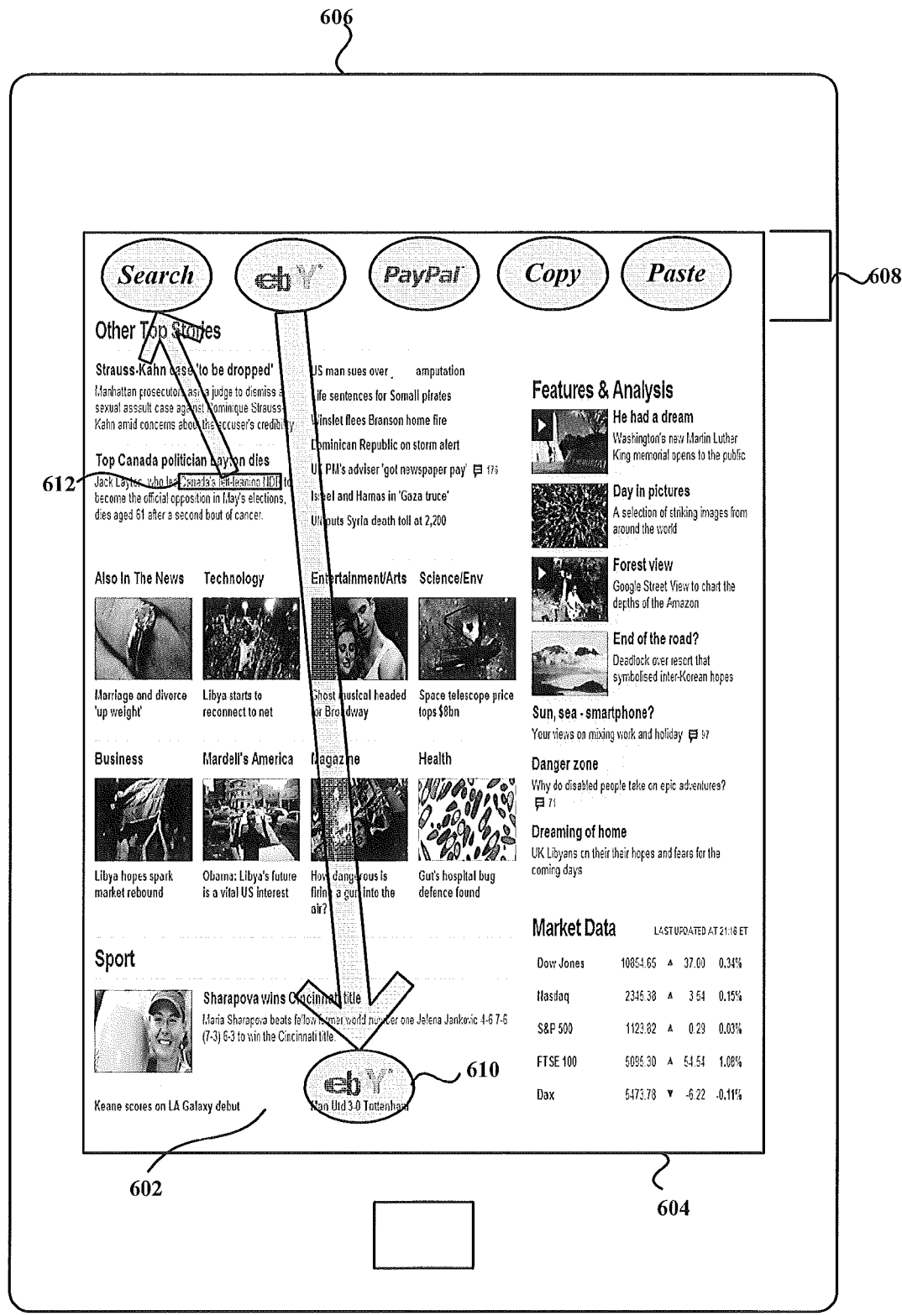
FIG. 6 is a diagram illustrating the use of an enhanced cursor palette on displayed content, consistent with some embodiments.

FIG. 6 is a diagram illustrating the use of an enhanced cursor palette on displayed content, consistent with some embodiments. To illustrate the method described in FIG. 6, certain steps of the method described in FIG. 5 will be discussed in conjunction with FIG. 6. As shown in FIG. 6, content 602 is displayed on a display 604 of a processing device 606. Consistent with some embodiments, processing device 606 may include any appropriate combination of hardware and/or software having a processor and capable of reading instructions stored on a non-transitory machine-readable medium for execution by the processor. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Further, processing device 606 may be configured for wired and/or wireless communication over a network. According to some embodiments, processing device 606 may be a mobile device, such as a mobile phone, a smart phone, or touchscreen device such as a tablet computer like the Apple™ iPad™. According to other embodiments, processing device 606 may be a processing device such as a personal computer, a personal digital assistant (PDA), or a notebook computer.

Consistent with some embodiments processing device 606 includes a machine-readable medium, such as a memory (not shown) that includes instructions for execution by a processor (not shown) for causing processing device 606 to perform specific tasks. For example, such instructions may include a displaying content 602, such as the shown web page, or other applications that display content 602 corresponding to a text document, a Microsoft® Word® document, or an Adobe® PDF® document. Further, content 602 may be content displayed by a particular application or "app" stored in a memory of processing device 606 and executed by a processor of processing device 606. For example, content 602 may be a news website, such as shown in FIG. 6, or content 602 may be an online auction or transaction web page displayed by a web page or application.

Content 602 may also be a live or saved image captured by a camera coupled to processing device 606 or stored in memory of processing device 606 that has been processed using optical character recognition (OCR). Consequently, a user may view an image and perform actions on portions of the image that can be recognized using OCR. For example, processing device may be a smart phone or tablet computer having an integrated camera such that a user can use the camera to provide an augmented reality and view the surrounding area and perform actions on, for example, the names of stores and restaurants that are displayed such that the user can search for additional information or reviews about these stores and restaurants. In addition, enhanced cursor palette 608 may further have a translation enhanced cursor such that if a user is in a foreign country with signs in languages that the user cannot read, the user can view the surrounding area using the camera of the processing device, and select the translate enhanced cursor from enhanced cursor palette 608 to use on selected signs to translate the signs into a language that the user can read.

As shown in FIG. 6, once an enhanced cursor palette 608 is enabled (502), enhanced cursor palette 608 is displayed (504) near content 602. For example, enhanced cursor palette 608 may be displayed in a dock above content 602, as shown in FIG. 6. The user may then select an enhanced cursor 610 from enhanced cursor palette 608 (506) and move the selected enhanced cursor 610 onto content of interest (508). As shown in FIG. 6, a user may want to search eBay for merchandise related to either the Manchester or Tottenham football (soccer) clubs and, thus, will move enhanced cursor 610 onto that displayed content. The user would then activate the selected enhanced cursor 610 (510) such that the assigned action of a searching eBay would be performed on the displayed content within the selected enhanced cursor 610. Once the assigned action is performed, another window or screen would be displayed on display 604 showing the results of the assigned and executed action associated with the selected enhanced cursor 610. Consistent with other embodiments, as user may select additional enhanced cursors from palette 608 to perform multiple actions on content 602 in parallel. For example, user may perform an eBay search using enhanced cursor 610 and also a web search on the same or different displayed content using the search enhanced cursor from cursor palette 608.

Consistent with other embodiments, a user may select displayed content 612 and either copy/paste content 612 or drag/drop content 612 into one of the enhanced cursors displayed in enhanced cursor palette 608. For example, a user wanting to know more about "Canada's left-leaning NDP" could select that text and drag/drop or copy/paste the text into the search enhanced cursor displayed in enhanced cursor palette 608. A new window, screen, or tab would then be displayed showing the search results for the selected text.

Moreover, after the predefined or assigned actions have been executed or performed by the enhanced cursor, the enhanced cursor can provide additional functionality such as communicating the executed actions to a social networking site such as Facebook™, Twitter™, or Google+™. Such social networking communications may be configured in step 106 and may be personalized such that the communications only occur when certain actions are performed, such as bidding on, or purchasing items online using the enhanced cursor. For example, after searching eBay for merchandise related to either the Manchester or Tottenham football clubs, the user may purchase a jersey using the PayPal enhanced cursor from enhanced cursor palette 608. After the purchase has been completed, the enhanced cursor could be configured to post a tweet or status update stating "USER just purchased a signed #10 jersey from eBay™ SELLER using PayPal™." The language of the social networking message may be fully configurable by the user, and could be configured in accordance with FIG. 4.

In addition to the embodiments described above, enhanced cursor 208 (or a palette 608 of enhanced cursors 610) may be integrated in additional platforms. For example, enhanced cursor 208 may be integrated into gaming consoles, such as the Nintendo Wii, Microsoft XBOX360, or the Sony Playstation 3. In such integrations, enhanced cursor 208 may be used to execute a predefined action on content displayed by the gaming console in the same way as on processing device 206 or 606, described above. Similarly, enhanced cursor 208 may utilized to execute a predefined action on content displayed by a digital set-top box (STB) such as provided by a cable or satellite television provider. Enhanced cursor 208 may also be used along with mapping websites, software programs, or applications, wherein the one or more predetermined actions of enhanced cursor 208 can correspond to obtaining a current location (if used in a Global Positioning System (GPS)-enabled device), or obtaining driving directions to a highlighted displayed location.

Enhanced cursor 208 may also be configured to work with additional APIs provided by PayPal, Inc. and eBay Inc., of San Jose, Calif. Such additional APIs may include, but not be limited to the "Flick" API, which allows a user to perform a flicking or sliding motion on a touch screen device to perform an action. Using the "Flick" API, enhanced cursor 208 could be configured to perform a desired action on desired content in response to a flick, swipe, or slide of the enhanced cursor on or to desired content. Consistent with some embodiments, the flick, swipe, or slide of enhanced cursor 208 on or to desired content could cause an action on desired content wherein the result of the action is transmitted to another device. For example, enhanced cursor 208 may be configured to perform an eBay search and the "Flick" API may be configured to display content on a secondary device, such as an internet-enabled television. Thus, when enhanced cursor 208 is moved on to the desired content and enhanced cursor 208 is flicked, the results of the eBay search could be displayed on the internet-enabled television. Enhanced cursor 208 may also be configured to work with additional third-party APIs, such as APIs to perform predetermined actions corresponding to the third party or the third party's business. This may include third party APIs designed for integration with social media sites or for integrating one or more people such that selected people can be notified about a user's actions performed using enhanced cursor 208.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide an enhanced cursor-like content selection area, or Smart Spot, that enhances user interaction with displayed content by allowing a user to perform assigned or predefined actions on the displayed content simply by moving the enhanced cursor onto the displayed content and activating the enhanced cursor. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A non-transitory computer-readable medium having instructions for execution by a processor that, when executed, cause the processor to perform a method for enhancing user interaction with displayed content, the method comprising:
    detecting subject matter of content in an online website page being displayed on a display of a device coupled to the processor, and wherein the online website page includes one or more areas having the displayed content;
    displaying one or more inactive enhanced cursors in an initial area of the display such that each of the one or more inactive enhanced cursors contains a display of either predefined information or an assigned action when inactive, wherein the one or more assigned actions displayed are automatically displayed upon the subject matter being detected, the one or more assigned actions including at least one of a search query creation action for auctions based on the detected subject matter content, a bid placement action based on the detected subject matter content, and a payment initiation action based on the detection subject matter content; and
    executing one of the displayed assigned actions displayed in one of the inactive enhanced cursors when a user selects one of the inactive enhanced cursors containing a corresponding one of the displayed assigned action in the initial area and subsequently activates the selected inactive enhanced cursor by moving the selected inactive enhanced cursor from the initial area of the display and placing the selected inactive enhanced cursor onto a portion of the displayed content within one of the one or more areas such that upon the placement, the selected inactive enhanced cursor is active and the corresponding displayed assigned action is executed using the portion of the displayed content at the placed area to perform one of the search query creation, the bid placement action, or the payment initiation action.

2. The non-transitory computer readable medium of claim 1, wherein displaying the one or more inactive enhanced cursors comprises:
displaying the one or more inactive enhanced cursors in an area of the display where content is not currently displayed.

3. The non-transitory computer readable medium of claim 1, wherein activates the selected inactive enhanced cursor also comprises double-clicking or double-tapping the selected inactive enhanced cursor.

4. The non-transitory computer readable medium of claim 1, wherein the method further comprises deactivating the selected inactive enhanced cursor after executing the corresponding displayed assigned action.

5. The non-transitory computer readable medium of claim 1, wherein the content comprises text displayed on a web page, text displayed by a program, or text recognized from optical character recognition (OCR).

6. The non-transitory computer readable medium of claim 1, wherein the device comprises a touch screen device.

7. The non-transitory computer readable medium of claim 1, wherein the one or more inactive enhanced cursors include configurable elements.

8. The non-transitory computer readable medium of claim 7, wherein the configurable elements comprise:
the one or more assigned actions;
elements associated with the one or more assigned actions; and
an appearance of the one or more inactive enhanced cursors.

9. The non-transitory computer readable medium of claim 1 wherein the method further comprises:
communicating the execution of the one of the one or more displayed assigned actions to a social networking service.

10. A method of enhancing user interaction with content displayed on a touch screen device, comprising:
detecting, using a processor of the touch screen device, subject matter content in an online website page being displayed on a display of the touch screen device, and wherein the online website site page include one or more areas having the displayed content;
displaying, on the display of the touch screen device, one or more inactive enhanced cursors in an initial area of the display such that each of the one or more inactive enhanced cursors contains a display of either predefined information or an assigned action when inactive, wherein the one or more assigned actions displayed are automatically displayed upon the subject matter being detected, the one or more assigned actions including at least one of a search query creation action for auctions based on the detected subject matter content, a bid placement action based on the detected subject matter content, and a payment initiation action based on the detection subject matter content;
receiving, at a touch screen of the touch screen device, a selection of one of the inactive enhanced cursors containing a corresponding one of the displayed assigned actions in the initial area;
receiving, at the touch screen of the touch screen device subsequent to the selection, an activation command for the selected inactive enhanced cursor by a movement and placement of the selected inactive enhanced cursor from the initial area of the display to a portion of the displayed content within one of the one or more areas such that upon the placement, the selected inactive enhanced cursor is active; and
in response to receiving the selection and the activation command, executing, using a processor of the touch screen device, the corresponding displayed assigned action by using the portion of the displayed content at the placed area to perform at least one of the search query creation action for auctions, the bid placement action, and the payment initiation action.

11. The method of claim 10, wherein receiving the selection further comprises receiving double-clicking or double-tapping one of the inactive enhanced cursors.

12. The method of claim 10, wherein the at least one enhanced cursor is inactive after the executing.

13. The method of claim 10, wherein displaying one or more inactive enhanced cursors comprising displaying the one or more inactive enhanced cursors in a region of a viewable area where no content or text is displayed.

14. The method of claim 10, wherein the one or more inactive enhanced cursors is configurable, configuration of the one or more inactive enhanced cursors comprising:
selecting the one of the one or more assigned actions for one of the one or more inactive enhanced cursors;
determining parameters related to the one of the one or more assigned actions; and
selecting an appearance of the one of the one or more inactive enhanced cursors.

15. The method of claim 10, further comprising:
communicating the executing to a social networking service.

16. The method of claim 10, wherein the content comprises text displayed on a web page, text displayed by a program, or text recognized from optical character recognition (OCR).

17. A non-transitory computer-readable medium having instructions for execution by a processor that, when executed, cause the processor to perform a method for enhancing user interaction with displayed content, the method comprising:
detecting subject matter of content being displayed in a page on a display of a device coupled to the processor, and wherein the page includes one or more areas having the displayed content;
displaying at least one or more enhanced cursors at an initial area of the display at a position in which no content is being displayed, the at least one or more enhanced cursors being inactive until activated and each of the one or more enhanced cursors displaying a first assigned action or a second assigned action,
wherein at least one or more of the first assigned actions that are displayed comprises at least one of displaying a current time and displaying a current temperature, when the at least one enhanced cursor is inactive, and
wherein each of the at least one or more of the second assigned actions that are displayed, are automatically displayed upon the subject matter being detected each of the one or more of the second assigned actions being at least one of a search query creation action based on the detected subject matter content, a bid placement action based on the detected subject matter content, and a payment initiation action based on the detection subject matter content; and
executing one of the displayed second assigned actions displayed in one of the enhanced cursors when a user selects one of the enhanced cursors having a corresponding one of the displayed second assigned actions in the initial area and subsequently activates the selected enhanced cursor by moving the selected enhanced cursor form the initial area of the display and placing the selected enhanced onto a portion of the display content within one of the one or more areas such that upon the placement, the selected enhanced cursor is active and the corresponding displayed second assigned action is executed using the portion of the displayed content at the placed area to perform one of the search query, the bid placement action, or the payment initiation is executed.

18. The computer-readable medium of claim 17, further comprising:

deactivating the at least one enhanced cursor after executing the corresponding displayed second assigned action.

* * * * *